(12) United States Patent
Hayashi et al.

(10) Patent No.: US 9,515,482 B2
(45) Date of Patent: Dec. 6, 2016

(54) POWER GENERATOR, PORTABLE DEVICE, POWER GENERATION SCHEME IDENTIFYING SYSTEM, AND POWER GENERATION SCHEME IDENTIFYING METHOD

(75) Inventors: Kouki Hayashi, Chiyoda-ku (JP); Masanori Ishida, Chiyoda-ku (JP); Hosei Matsuoka, Chiyoda-ku (JP); Takashi Ninjouji, Chiyoda-ku (JP)

(73) Assignee: NTT DOCOMO, Inc., Chiyoda-ku, Tokyo (JP)

( * ) Notice: Subject to any disclaimer, the term of this patent is extended or adjusted under 35 U.S.C. 154(b) by 497 days.

(21) Appl. No.: 13/823,880

(22) PCT Filed: Sep. 2, 2011

(86) PCT No.: PCT/JP2011/004941
§ 371 (c)(1),
(2), (4) Date: Mar. 15, 2013

(87) PCT Pub. No.: WO2012/042749
PCT Pub. Date: Apr. 5, 2012

(65) Prior Publication Data
US 2013/0175882 A1 Jul. 11, 2013

(30) Foreign Application Priority Data

Sep. 30, 2010 (JP) ................. 2010-221662

(51) Int. Cl.
*H02J 1/00* (2006.01)
*H02J 7/35* (2006.01)
(Continued)

(52) U.S. Cl.
CPC .............. *H02J 1/00* (2013.01); *H01M 2/1066* (2013.01); *H01M 10/425* (2013.01); *H02J 7/35* (2013.01);
(Continued)

(58) Field of Classification Search
CPC ...................................... H02J 1/00; H02J 7/35
(Continued)

(56) References Cited

U.S. PATENT DOCUMENTS

2006/0068241 A1* 3/2006 Tanaka ........................... 429/12
2006/0085167 A1 4/2006 Warfield et al.
(Continued)

FOREIGN PATENT DOCUMENTS

CN 101465553 A * 6/2009
JP 2008-286538 A 11/2008
(Continued)

OTHER PUBLICATIONS

Chinese-language Office Action dated Jul. 23, 2014, with English translation (Seventeen (17) pages).
(Continued)

*Primary Examiner* — Rexford Barnie
*Assistant Examiner* — Thai Tran
(74) *Attorney, Agent, or Firm* — Crowell & Moring LLP

(57) ABSTRACT

Consciousness of environmental conservation is increasing nowadays, and there are power generators for a portable device and employing power generation schemes without a $CO_2$ discharge, such as solar power generation and hand-crank power generation. When, however, power is supplied, information indicating that the power is obtained from clean energy without a $CO_2$ discharge is unknown at the portable-device side. When power is supplied from the power generator to the portable device, a power generation scheme identifier for identifying a power generation scheme is transmitted. The portable device identifies the power generation scheme identifier, and can recognize the power generation scheme of the connected power generator. A supplied power level is recognized based on a power level of the storage battery of the portable device at a time point (Continued)

of starting the power supply, and a power level of the storage battery at a time point of terminating the power supply. Since the power level in the storage battery is managed in this manner using the power generation scheme identifier, it becomes possible to determine whether or not the power generation scheme of the power in the storage battery is a clean scheme.

3 Claims, 10 Drawing Sheets

(51) Int. Cl.
*H01M 2/10* (2006.01)
*H01M 10/42* (2006.01)

(52) U.S. Cl.
CPC ..... *H01M 2010/4271* (2013.01); *Y02E 10/566* (2013.01)

(58) Field of Classification Search
USPC .......................................................... 307/149
See application file for complete search history.

(56) References Cited

U.S. PATENT DOCUMENTS

| | | | |
|---|---|---|---|
| 2008/0084177 A1 | 4/2008 | Sander et al. | |
| 2008/0278110 A1* | 11/2008 | Lin | H02J 7/35 320/101 |
| 2010/0035664 A1 | 2/2010 | Liu | |
| 2010/0094476 A1 | 4/2010 | Hamilton, II et al. | |
| 2010/0114800 A1 | 5/2010 | Yasuda et al. | |

FOREIGN PATENT DOCUMENTS

| | | |
|---|---|---|
| JP | 2009-064809 A | 3/2009 |
| JP | 2009-070083 A | 4/2009 |
| JP | 2010-108833 A | 5/2010 |
| JP | 2010-119242 A | 5/2010 |

OTHER PUBLICATIONS

"Solar Charge eco", strapya.com, no date, 10 pages total.
"Development of 'FOMA eco solar panels 01' Solar Charger", NTT DOCOMO, nttdocomo.co.jp, May 13, 2010, 4 pages total.
"Solar Phone SH007", KDDI, au.kddi.com, 2010, 2 pages total.
PCT/JP2011/004941 PCT/ISA/210, dated Nov. 29, 2011, 1 page.
Chinese Office Action dated Mar. 10, 2015, with English translation (Fourteen (14) pages).
PCT/JP2011/004941 PCT/IB/338, dated Apr. 18, 2013, 1 page.
PCT/JP2011/004941 PCT/IB/373, dated Apr. 9, 2013, 1 page.
PCT/JP2011/004941 PCT/ISA/237 (English translation), dated Nov. 29, 2011, 3 pages.
European Search Report issued in European counterpart application No. 11828317.5-1804/2624406 dated Sep. 9, 2016 (Nine (9) pages).

* cited by examiner

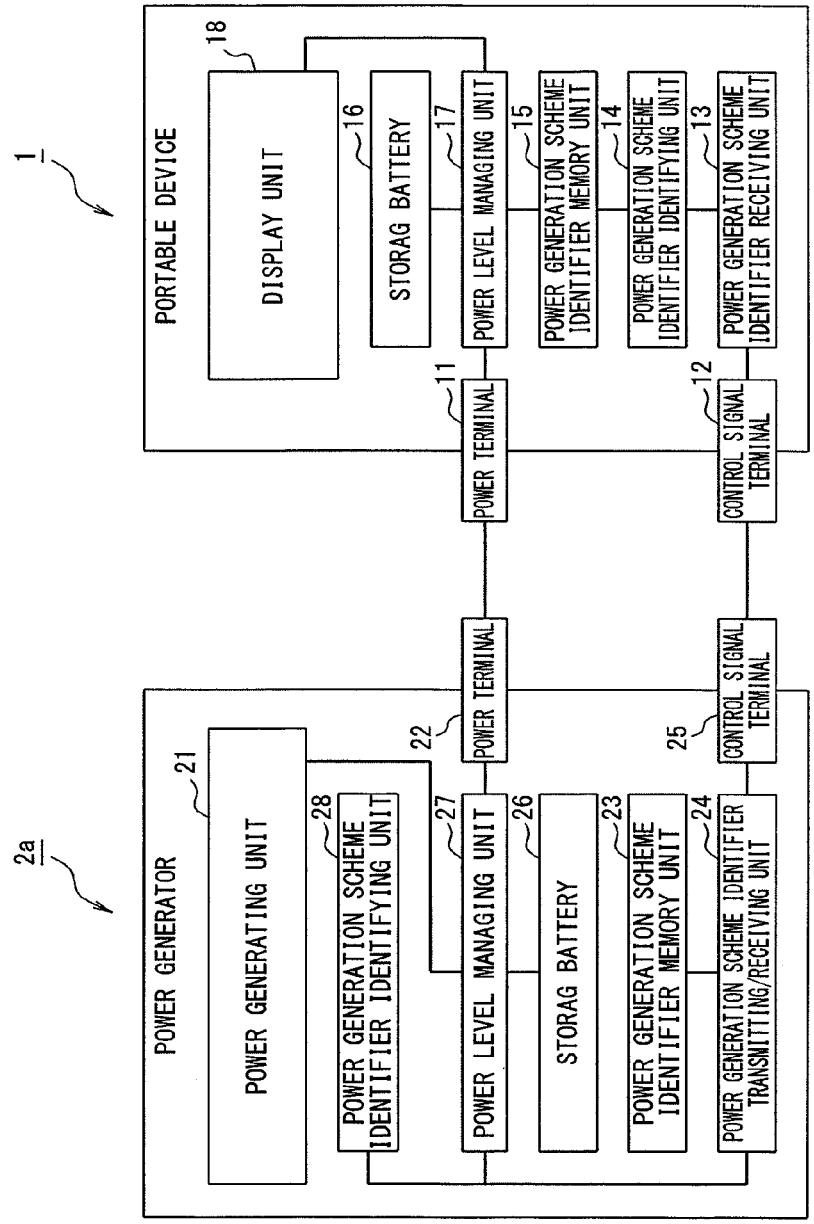

FIG. 9

| POWER GENERATION SCHEME IDENTIFIER | | |
|---|---|---|
| IDENTIFIER | POWER GENERATION SCHEME | STORED POWER LEVEL |
| IDENTIFIER: 0 | COMMERCIALLY AVAILABLE POWER SOURCE | 2 0 0 [mWh] |
| IDENTIFIER: 1 | SOLAR POWER GENERATION | 7 0 0 [mWh] |
| IDENTIFIER: 2 | WIND POWER GENERATION | 0 [mWh] |
| IDENTIFIER: 3 | HAND-CRANK POWER GENERATION | 0 [mWh] |
| ⋮ | ⋮ | ⋮ |

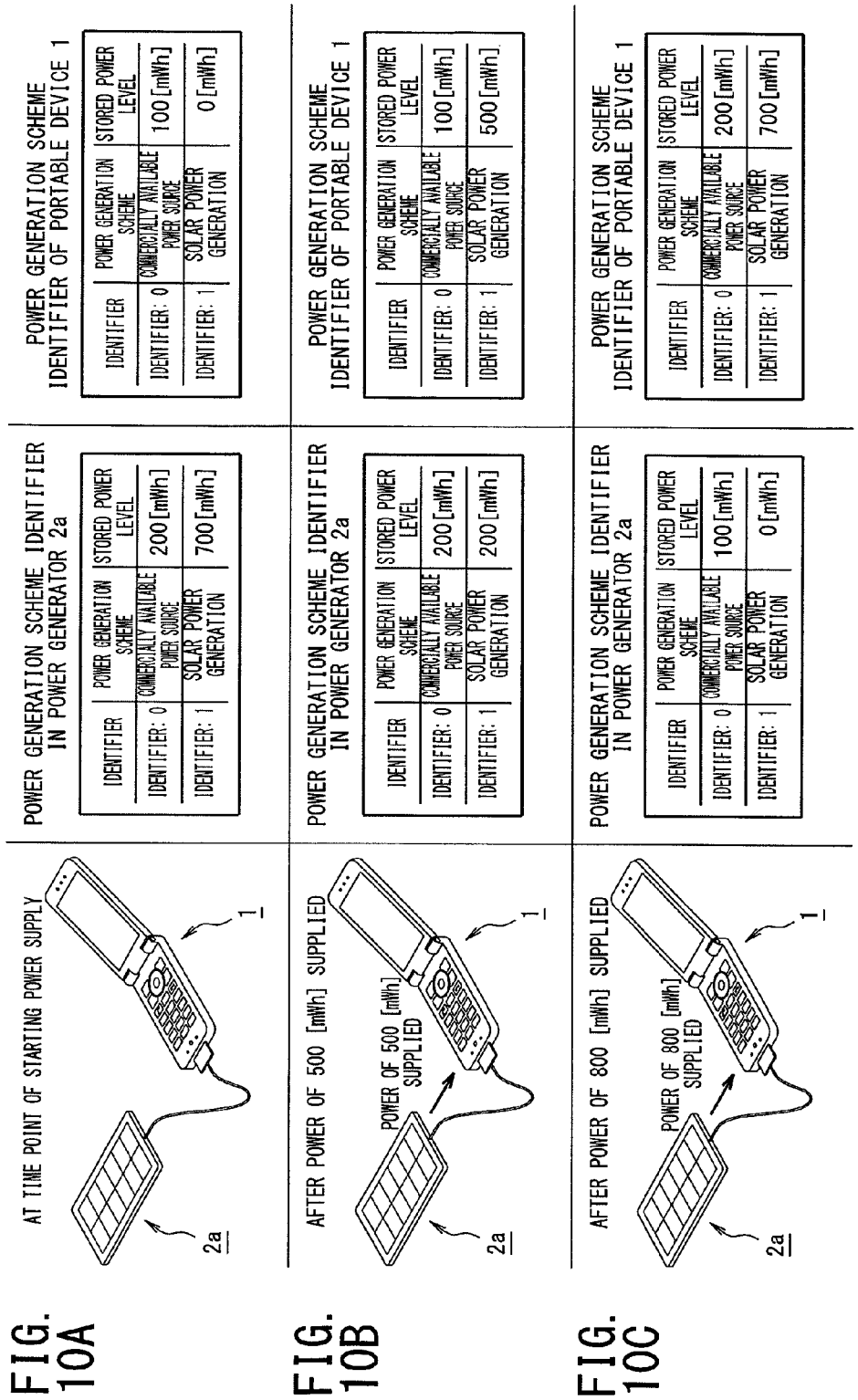

POWER GENERATOR, PORTABLE DEVICE, POWER GENERATION SCHEME IDENTIFYING SYSTEM, AND POWER GENERATION SCHEME IDENTIFYING METHOD

TECHNICAL FIELD

The present invention relates to a power generator, a portable device, a power generation scheme identifying system, and a power generation scheme identifying method, and more particularly to technologies of a power identifying method in a system including a device with a storage battery, and a feeding device or a power generator (hereinafter, referred to as a power generator) that supplies power to the storage battery.

BACKGROUND ART

Together with the increase of the ecology consciousness in recent years, solar power generators and hand-cranked power generators for portable devices, such as mobile telephones and laptop computers, are commercially available. For example, "Solar charge eco strap" sold by StrapyaNext Co., Ltd. is an auxiliary battery charger that is capable of solar power generation for mobile telephones (see Non-patent Document 1).

Moreover, "FOMA eco solar panel 01" sold by NTT DOCOMO, INC. is a battery charger utilizing solar power generation (see Non-patent Document 2).

Furthermore, "SOLAR PHONE SH007" sold by KDDI CORPORATION is a mobile telephone which has a solar panel built with the mobile telephone itself, and is capable of charging through solar power generation (see Non-patent Document 3). This "SOLAR PHONE SH007" can display the charge level charged through solar power generation as points.

According to Patent Document 1, identification information on a solar battery module is transmitted, and a device that has received that information manages the output of AC power.

Moreover, according to Patent Document 2, a battery cartridge has an identifier, and the identifier includes information on the history of the use (e.g., the number of charging, the charging cycle, and the charging time) of the battery cartridge.

PRIOR ART DOCUMENTS

Patent Documents

Patent Document 1: JP 2009-64809 A
Patent Document 2: JP 2010-108833 A

Non-patent Documents

Non-patent Document 1: "World's first charging with solar light, solar charge eco", Strapya, [online], [searched on Sep. 24, 2010] Internet <URL: http://www.strapya.com/categories/12_45_4043.html>

Non-patent Document 2: "Development of solar battery charger "FOMA eco solar panel"", NTT DOCOMO, [online], [searched on Sep. 24, 2010], Internet <URL: http://www.nttdocomo.co.jp/info/news_release/2010/05/13_01.html>

Non-patent Document 3: Production lineups, "SOLAR PHONE SH007", au by KDDI, [online], [searched on Sep. 24, 2010], Internet <URL: http://www.au.kddi.com/seihin/ichiran/kishu/sh007/index.html>

SUMMARY OF THE INVENTION

Problem to be Solved

Clean power generators for portable devices are come to market and available. When, however, power is supplied from the power generator to the portable device, there is no way of recognizing whether or not that energy is clean energy. Hence, when the power level derived from clean energy among stored power level of the portable device currently used by a user is presented to the user who is the user of the portable device to cause the user to be conscious of the power level derived from clean energy, ecology consciousness may be encouraged. According to Patent Document 1, the identification information is exchanged only for managing a total operating time of the solar battery module, and it is difficult to address the above-explained disadvantage.

The present invention has been made to address the above-explained disadvantage of the prior arts, and it is an object of the present invention to provide a power generator, a portable device, a power generation scheme identifying system, and a power generation scheme identifying method that can identify a stored power level derived from clean energy on a portable device or on a rechargeable battery that supplies power to the portable device.

Solution to the Problem

A power generator according to an aspect of the present invention includes: a power generating unit configured to generate power to be supplied to an external device; and a power generation scheme identifier transmitting unit configured to transmit, to the external device, a power generation scheme identifier for identifying a power generation scheme of the power generated by the power generating unit, and the external device is configured to present, to a user of the external device, the supplied power and the power generation scheme identified by the power generation scheme identifier. According to this configuration, it becomes possible to present a user whether or not power supplied to a portable device is power derived from clean energy.

A power generator according to another aspect of the present invention includes: a power generating unit configured to generate power to be supplied to an external device; a storage battery configured to store the power generated by the power generating unit together with other powers; a managing unit configured to manage the power stored in the storage battery in association with a power generation scheme identifier for identifying a power generation scheme of the power; and a power generation scheme identifier transmitting unit configured to transmit the power generation scheme identifier managed in the managing unit to the external device, and the external device is configured to present, to a user of the external device, the supplied power and the power generation scheme identified by the power generation scheme identifier. According to this configuration, even if the power generator is provided with the storage battery, the power generation scheme of the power stored in the storage battery can be identified, and the identification result can be presented to the user.

A portable device according to an aspect of the present invention includes: a power generation scheme identifier receiving unit configured to receive, from a power generator, a power generation scheme identifier for identifying a power generation scheme of power supplied from the power generator; and a presenting unit configured to present the power supplied from the power generator and the power generation scheme identified by the power generation scheme identifier received by the power generation scheme identifier receiving unit, and the power and the power generation scheme is presented in association with each other. According to this configuration, it becomes possible to present the user whether or not the power supplied to the portable device is power derived from clean energy.

A power generation scheme identifying system according to an aspect of the present invention includes: the above-explained power generator; and a portable device that includes: a power generation scheme identifier receiving unit configured to receive, from the power generator, a power generation scheme identifier for identifying a power generation scheme of power supplied from the power generator; and a presenting unit configured to present the power supplied from the power generator and the power generation scheme identified by the power generation scheme identifier received by the power generation scheme identifier receiving unit, and the power and the power generation scheme are presented in association with each other. According to this configuration, it becomes possible to present the user whether or not the power supplied to the portable device is power derived from clean energy.

A power generation scheme identifying method according to an aspect of the present invention includes: a power generating step for generating power to be supplied to an external device; a transmitting step for transmitting, to the external device, a power generation scheme identifier for identifying a power generation scheme of the power generated by the power generating unit; and a presenting step for causing the external device to present the supplied power and the power generation scheme identified by the power generation scheme identifier to a user of the external device. This makes it possible to present the user whether or not the power supplied to the portable device is power derived from clean energy.

The power generation scheme identifying method may further include: a managing step for managing power stored in a storage battery that stores the power generated by the power generating unit together with other powers in association with a power generation scheme identifier for identifying a power generation scheme of each power, in which in the transmitting step, the power generation scheme identifier managed in the managing step is transmitted to the external device. According to this method, even if the power generator is provided with the storage battery, the power generation scheme of the power stored in the storage battery can be identified, and the identification result can be presented to the user.

Advantageous Effects of the Invention

According to the present invention, a user of a portable device becomes able to recognize whether or not power supplied to the portable device is power derived from clean energy, and thus it can bring about the encouragement of ecology consciousness of the user.

BRIEF DESCRIPTION OF THE DRAWINGS

FIG. 7 is a configuration diagram of a power generator and a portable device according to a second embodiment of the present invention;

FIG. 9 is a diagram illustrating information described in a power generation scheme identifier according to the second embodiment of the present invention; and FIGS. 10A to 10C are diagrams illustrating a change in information described in the power generation scheme identifier according to the second embodiment of the present invention.

DESCRIPTION OF EMBODIMENTS

Embodiments of the present invention will now be explained below with reference to the drawings. The equivalent portions to those in other figures will be denoted by the same reference sign in respective figures to be referred in the following explanations.

(Outline of the Invention)

Displayed on an indicator of a remaining power level of a storage battery on a display built in a portable device is whether power is supplied from clean energy like a solar power generator or is supplied from a commercially available AC power source through an AC adapter. Hence, it becomes possible to display how much power derived from clean energy remains among the remaining power level of the storage battery in the portable device.

A power generator utilizing clean energy, such as a solar power generator and a hand-cranked power generator, has a power generation scheme identifier for identifying that such a device itself is a clean power generator. The power generator includes a power generation scheme identifier memory unit and a power generation scheme identifier transmitting/receiving unit.

The portable device with the storage battery to which power is supplied from the power generator includes a power generation scheme identifier memory unit, a power generation scheme identifier receiving unit, a power generation scheme identifier identifying unit, a managing unit that manages the remaining power level of the storage battery, and a display unit.

When connected with the power generator, the portable device recognizes a clean power generation identifier, and recognizes whether or not power is supplied from the power generator which has the clean power generation identifier. This enables the portable device to measure the power level supplied when the power is supplied from the power generator with the clean power generation identifier, and to manage the remaining power level derived from clean energy and the other remaining power level among the remaining power level of the storage battery. The remaining battery power meter indicating how much the remaining power level derived from clean energy is in the total remaining power level is displayed on the screen of the display of the portable device.

(First Embodiment)

A first embodiment corresponds to a case in which the power generator has no storage battery. A power generation scheme identifying system of the present embodiment will now be explained below in detail with reference to the drawings.

(Configuration of Power Generation Scheme Identifying System)

Figure 1:
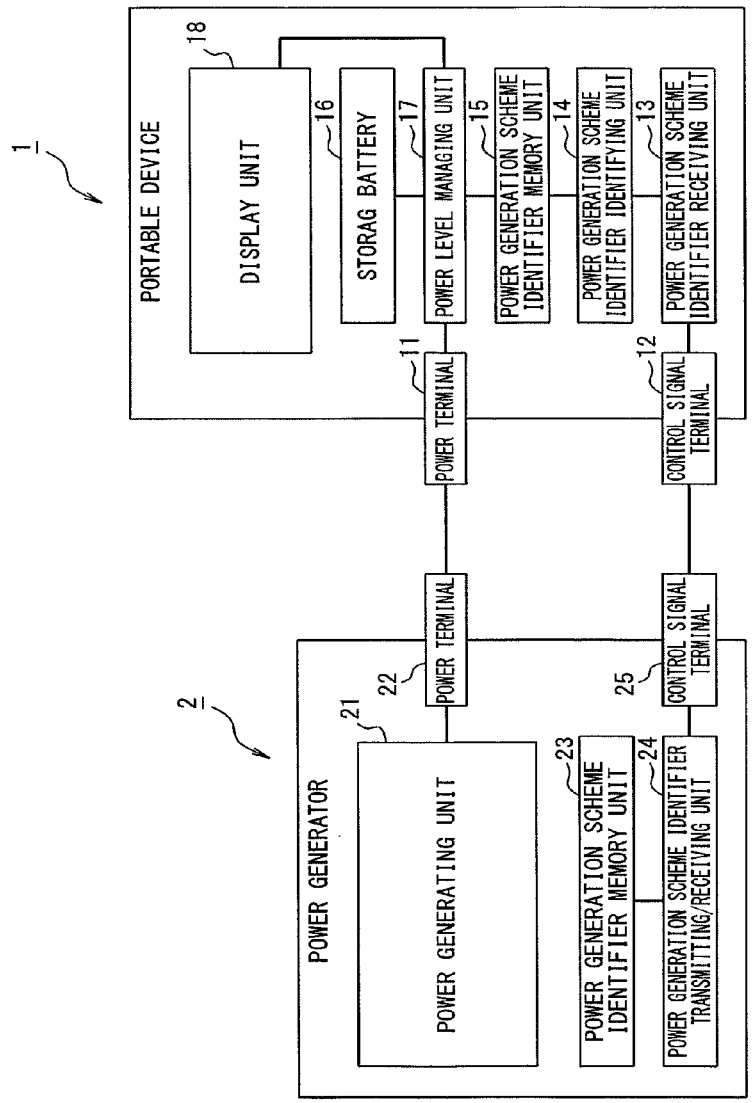
FIG. 1 is a configuration diagram of a power generator and a portable device according to a first embodiment of the present invention.

FIG. 1 is a diagram illustrating an example configuration of the power generation scheme identifying system according to a first embodiment of the present invention. With reference to this figure, the power generation scheme identifying system of this example includes a portable device 1 like a mobile telephone, and a power generator 2 that supplies power to this portable device 1.

The power generator 2 includes a power generating unit 21, e.g., a solar panel, or a hand-cranked generator utilizing counter-electromotive force of a motor, which generates power, a power terminal 22 that supplies power obtained from the power generating unit 21 to an external device, a power generation scheme identifier memory unit 23 that stores a power generation scheme identifier allowing identification of a power generation scheme of the local device, a power generation scheme identifier transmitting/receiving unit 24 that transmits the power generation scheme identifier to the external device, and a control signal terminal 25 for transmitting the power generation scheme identifier.

The portable device 1 includes a power terminal 11 to be connected with an external device for receiving supplied power, a control signal terminal 12 for receiving the power generation scheme identifier, a power generation scheme identifier receiving unit 13 that receives the power generation scheme identifier notified from the connected power generator 2, a power generation scheme identifier identifying unit 14 that identifies the power generation scheme identifier of the connected power generator 2, a power generation scheme identifier memory unit 15 that stores the power generation scheme identifier, a storage battery 16 for storing power to be supplied to the portable device 1, a power level managing unit 17 which identifies that from which power generator the power is supplied and what identifier the power supply possesses, and which manages the remaining power level of the storage battery, and a display unit 18 that displays the remaining power level of the storage battery managed by the power level managing unit.

(Example Connection)

Figure 2:
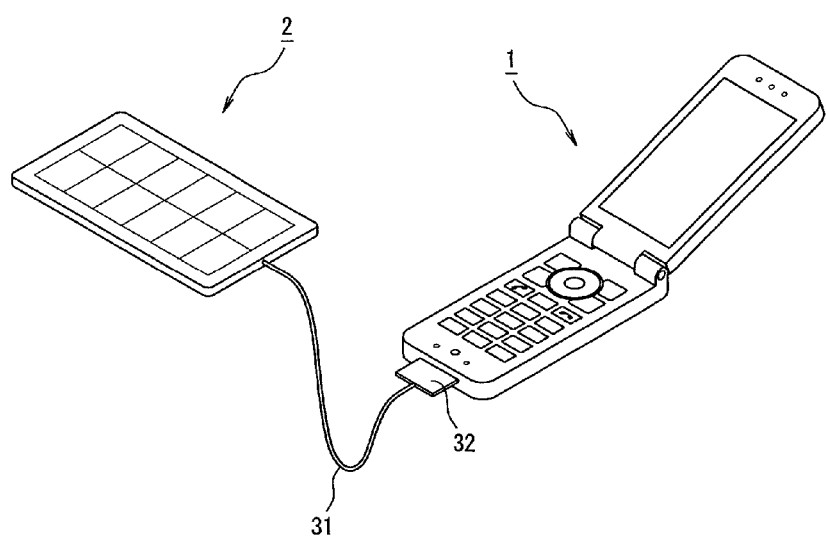
FIG. 2 is a diagram illustrating an example connection between the power generator and the portable device according to the first embodiment of the present invention.

FIG. 2 is a diagram illustrating an example connection state between the portable device 1 and the power generator 2 according to the power generation scheme identifying system of this example. The power generator 2 of this example is a device that generates power through the function of a solar panel. The portable device 1 of this example is a mobile telephone. When a connector 32 at the leading end of a cable 31 that is connected to the power generator 2 is connected to the portable device 1, the above-explained power terminal 11 and the power terminal 22 are electrically connected together. Hence, power is supplied from the power generator 2 to the portable device 1.

When the connector 32 is connected to the portable device 1, the above-explained control signal terminal 12 and the control signal terminal 25 are electrically connected together. Hence, when the power is supplied from the power generator 2 to the portable device 1, the power generation scheme identifier is transmitted from the power generator 2 to the portable device 1. The power generation scheme identifier is transmitted to the portable device 1 in order to cause a user of the portable device 1 to recognize the power generation scheme. Exchanging of the power generation scheme identifier enables the portable device 1 to identify that the power generation scheme of the power generator 2 is a clean power generation scheme without discharging of $CO_2$.

(Power Generation Scheme Identifier)

The content of the power generation scheme identifier of the power generator differs depending on the power generation scheme of the power generator. The power generation scheme identifier memory unit of the power generator stores, for example, an identifier "1" for solar power generation, an identifier "2" for wind power generation, and an identifier "3" for hand-crank power generation. As illustrated in FIG. 2 when, for example, the power generator 2 which generates power through solar light is connected to the portable device 1 and power is supplied thereto, a power generation scheme identifier "1" is stored in the power generation scheme identifier memory unit of the power generator 2. When the portable device 1 and the power generator 2 are connected via the connector 32, first, the power generation scheme identifier "1" is transmitted from the power generator 2 to the portable device 1. The portable device 1 which has received the power generation scheme identifier identifies the power generation scheme identifier through the power generation scheme identifier identifying unit. Identification of the identifier allows the portable device 1 to identify the connected power generator 2 is a power generator with the identifier "1", i.e., a power generator utilizing solar light.

(Connection with AC Power Source)

Next, an explanation will be given of a case in which power is supplied from a device that has no power generation scheme identifier.

Figure 3:
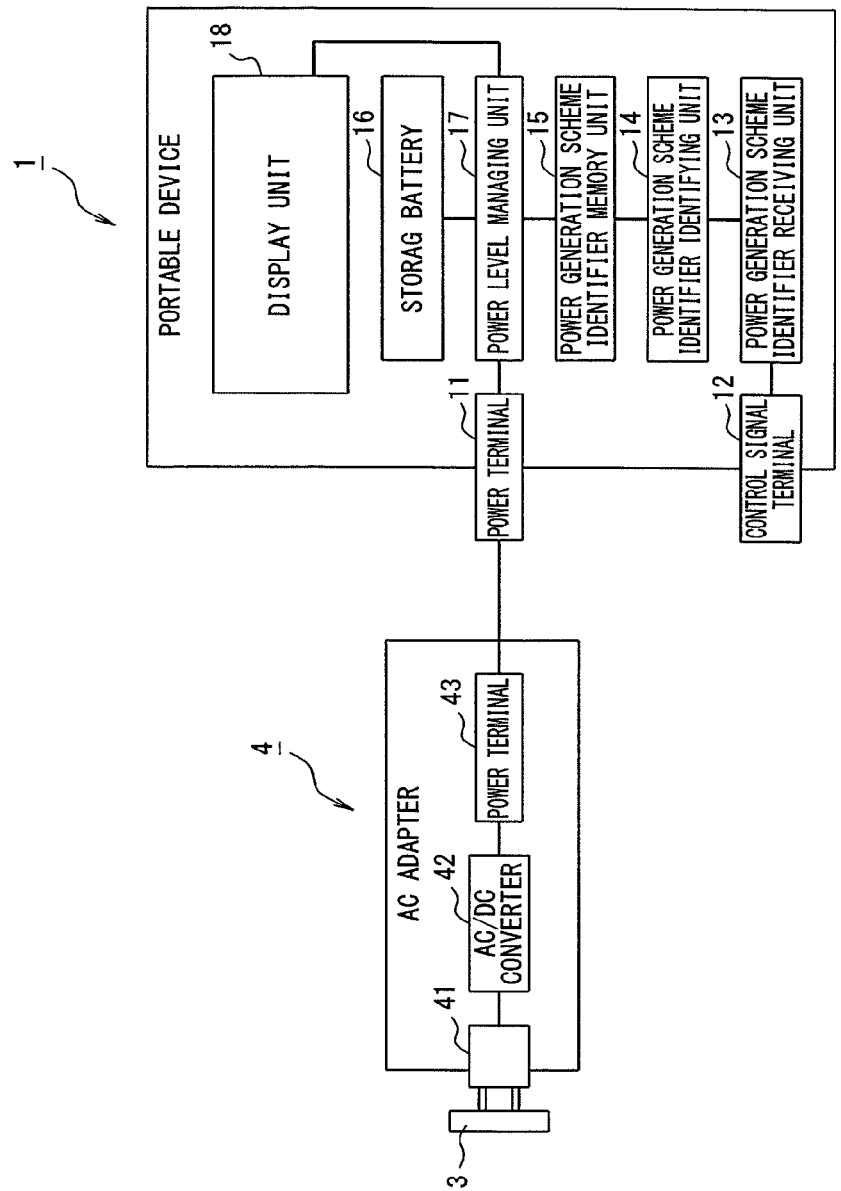
FIG. 3 is a diagram illustrating a case in which power is supplied from an AC power source to a portable device through an AC adapter having no power generation scheme identifier.

FIG. 3 is a diagram illustrating a case in which power is supplied from an AC power source to the portable device through an AC adapter having no power generation scheme identifier.

An AC power source 3 is a terminal for providing a commercially available power source to a connected device. An AC adapter 4 includes a power plug 41 that is electrically connected to the AC power source 3, an AC/DC converter 42 for converting AC voltage into DC voltage, and a power terminal 43 that supplies the DC voltage having undergone the conversion by the AC/DC converter 42 to an external device.

This AC adapter 4 has no power generation scheme identifier explained above. Hence, when power is supplied from the AC power source 3 to the portable device 1 through the AC adapter 4 which has no power generation scheme identifier, the portable device 1 is unable to identify from what kind of a device the power is supplied.

In this case, in order to identify from what kind of a device the power is supplied, the following configuration can be employed. That is, first, the AC adapter 4 is provided with the power generation scheme identifier memory unit which stores the power generation scheme identifier, and the power generation scheme identifier transmitting/receiving unit which transmits/receives the power generation scheme identifier. Next, the power generation scheme identifier memory unit has been storing, for example, a power generation scheme identifier "0", and an identifier "0" is let to indicate a power supply from the commercially available power source. This causes the portable device 1 to recognize that the power is supplied from the commercially available power source when the AC adapter 4 with the identifier is connected to the portable device.

As explained above, the portable device 1 identifies the power generation scheme identifier of the connected device, thereby identifying what kind of a power generation scheme the power generator that is the connected device employs when the power is supplied.

Power exchange and exchange of the power generation scheme identifier between the power generator and the portable device can be performed through either wired or wireless transmission/reception.

Regarding the exchange of the power generation scheme identifier between the power generator and the portable device, e.g., the conventionally well-known USB (Universal Serial Bus) standard can be utilized. That is, a scheme is applicable which describes an ID corresponding to the power generation scheme identifier for identifying the power generation scheme in the product ID, etc., in the USB device descriptor of the power generator, causes the portable device to obtain the device descriptor at the time of a negotiation of the connection between the power generator and the portable device to cause the portable device to identify the power generation scheme, and then starts the power supply from the power generator to the portable device.

(Power Level Managing unit)

Figure 4:
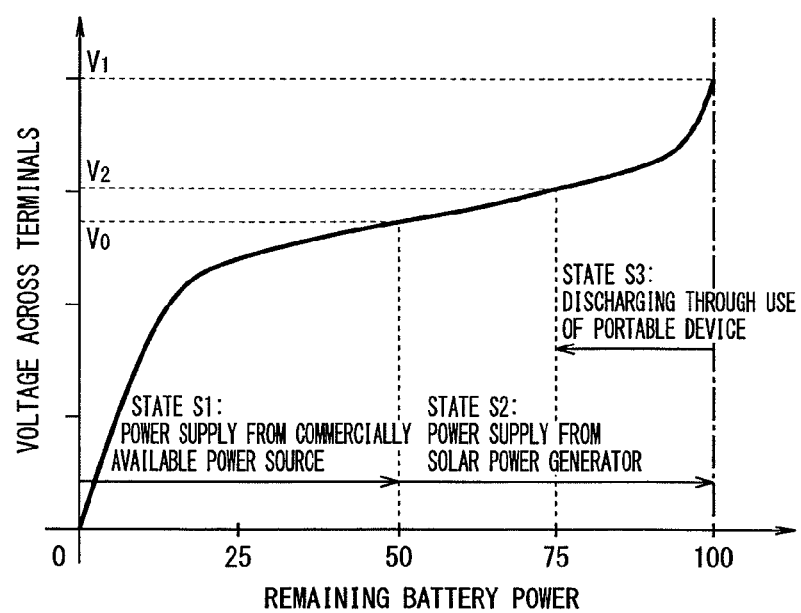
FIG. 4 is a schematic diagram of a power managing method in a power level managing unit.

FIG. 4 is a diagram illustrating an overview of a power management in the power level managing unit 17 in the portable device 1. This figure illustrates a case in which the remaining power level of the battery is measured through a voltage across the terminals of the storage battery 16 in the portable device 1.

When the remaining battery power of the storage battery 16 is 50% of the total capacity thereof before the power is supplied to the portable device 1, and when all 50% power is supplied from the commercially available power source, the voltage across the terminals of the storage battery indicates V0 (state S1 in FIG. 4). When the power is supplied to the portable device 1 from the power generator utilizing solar light in this state S1, and charging to 100% completes, the voltage across the terminals of the storage battery 16 indicates V1 (state S2 in FIG. 4). Next, when the portable device 1 is used and the storage battery 16 is discharged for a certain time period, the voltage across the terminals of the storage battery indicates V2 (state S3 in FIG. 4).

In this case, the power level managing unit 17 of the portable device 1 manages the power in the form of "power level from commercially available power source: 50%, and power level derived from clean energy: 0%". When the power supply and discharging are performed through the successive flows explained above, the power level managing unit 17 manages the power level in the storage battery 16 as follows. That is:

State S1: Power level from commercially available power source: 50%,

Power level derived from clean energy: 0%;

State S2: Power level from commercially available power source: 50%,

Power level derived from clean energy: 50%; and

State S3: Power level from commercially available power source: 50%,

Power level derived from clean energy: 25%.

This system presents information to the user as if clean energy is preferentially discharged among the power stored in the storage battery 16. This may prompt the user to select a power supply to the portable device 1 from the power generator derived from clean energy as much as possible.

(Example Display by Display Unit)

Figure 5:
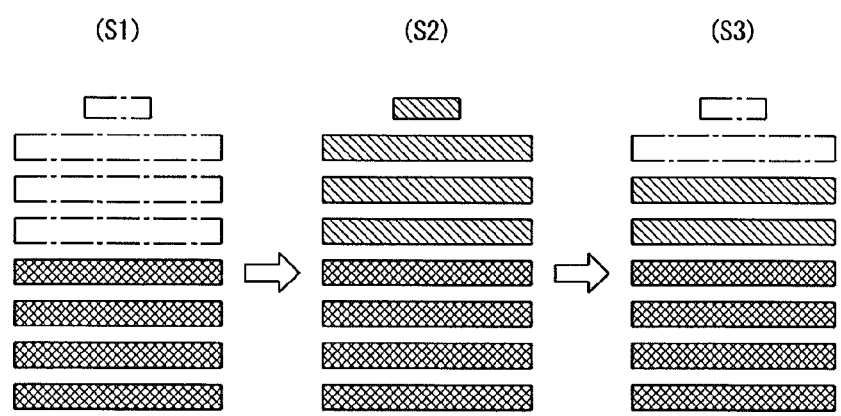
FIG. 5 is a diagram illustrating a remaining power level meter on a portable device.

An example display by the display unit 18 of the portable device 1 will now be explained. FIG. 5 illustrates the remaining power level meter displayed on the display unit 18 of the portable device 1. In the case of FIG. 5, the remaining power level is indicated by eight segments. In this case, power not derived from clean energy like the commercially available power source is indicated by black-out, while the power derived from clean energy like solar power generation is indicated by hatching.

A display action of the remaining power level meter when a similar transition in the state to FIG. 4 occurs is illustrated in FIG. 5. That is, in the case of the state S1, as indicated by FIG. 5 (S1), the device is charged by the commercially available power source and four segments are displayed in the black-out manner among the eight segments, thereby indicating that the remaining power level is 50%. Moreover, in the case of the state S2, like FIG. 5 (S2), it is indicated that the further 50% is charged through solar power generation, etc., and the remaining power level is 100%.

Furthermore, in the case of the state S3, the power is consumed and the four segments are indicated in a black-out manner among the eight segments like FIG. 5 (S3). Two segments are indicated by hatching (hereinafter, referred to as hatching indication). When taking a look to a transition from the state S2 to the state S3, the hatching indication of the two segments among the four segments which have been subjected to the hatching indication goes off. That is, the control is performed in such a way that the hatching indication of the power level goes off in first (to be decreased in first). This causes the user to recognize as if the power derived from clean energy is preferentially consumed with respect to the discharged power through the use of the portable device 1. The power level in the storage battery 16 is managed as explained with reference to FIG. 4 in the power level managing unit 17, the display as illustrated in FIG. 5 is enabled based on the managed content.

(Presentation of Remaining Power Level)

In the case of FIG. 5, a scheme of displaying the remaining battery power meter as means for presenting the remaining power level to the user is employed. However, it is not limited to this scheme, and the remaining power level may be presented to the user through other schemes.

Figure 6A:
FIG. 6A is a diagram illustrating example means for presenting a remaining power level to a user.

As illustrated in FIG. 6A, for example, the remaining power level may be output by a speech. In this example, a speech with a content of "clean energy is 50%, and other energy is 30%" is output from the speaker of a mobile telephone.

Figure 6B:
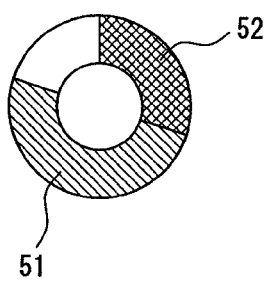
FIG. 6B is a diagram illustrating example means for presenting a remaining power level to a user.

Moreover, as illustrated in FIG. 6B, the remaining power level may be displayed by a pie chart. In this example, the pie chart indicating that clean energy 51 is "50%" and other energy 52 is "30%" is displayed on the screen of a mobile telephone.

Figure 6C:
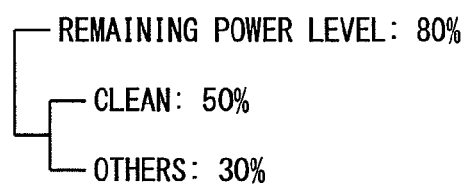
FIG. 6C is a diagram illustrating example means for presenting a remaining power level to a user.

Furthermore, as illustrated in FIG. 6C, the remaining power level may be displayed in numerals. In this example, numerals, such as "remaining power level: 80%" for the total remaining power level, and "clean: 50%" and "others: 30%" as breakdowns of the total remaining power, are displayed on the screen of a mobile telephone.

In any of those cases in FIG. 6A, FIG. 6B, and FIG. 6C, the remaining power level can be presented to the user. In addition, the remaining power level is not just presented, but the breakdown of the power derived from clean energy and the other power can be presented. This may encourage ecology consciousness of the user.

(Second Embodiment)

A second embodiment is a case in which a power generator has a storage battery. A power generation scheme identifying system according to the present embodiment will now be explained below in detail with reference to the drawings.

(Configuration of Power Generation Scheme Identifying System)

A power generator like a solar power generator may have a storage battery therein, and be capable of supplying power through solar power generation and through an AC power source like a commercially available power source to the storage battery in the power generator. In this case, unless it is identified whether the power stored in the power generator is power through solar power generation (i.e., power derived from clean energy) or is from the commercially available power source (i.e., power derived from unclean energy), there is a possibility that all power supplied to the portable device is recognized as power derived through solar power generation. In order to address this disadvantage, the power generator of the present embodiment employs a configuration illustrated in FIG. 7.

FIG. 7 is a diagram illustrating an example configuration of the power generation scheme identifying system according to the second embodiment of the present invention. With reference to this figure, the power generation scheme identifying system of this example includes the portable device 1 like a mobile telephone, and a power generator 2a that supplies power to this portable device 1.

The power generator 2a includes, in addition to the configuration of the power generator 2 in FIG. 1, a storage battery 26, a power level managing unit 27 that manages a power level stored in the storage battery 26, and a power generation scheme identifier identifying unit 28 that identifies a power generation scheme identifier when power is supplied from power generators with other power generation scheme identifiers. That is, according to the present embodiment, the power generation scheme identifier is an identifier which can identify the power level stored in the storage battery in the power generator for each power generation scheme. The portable device 1 employs the same configuration as that of the first embodiment.

Figure 8:
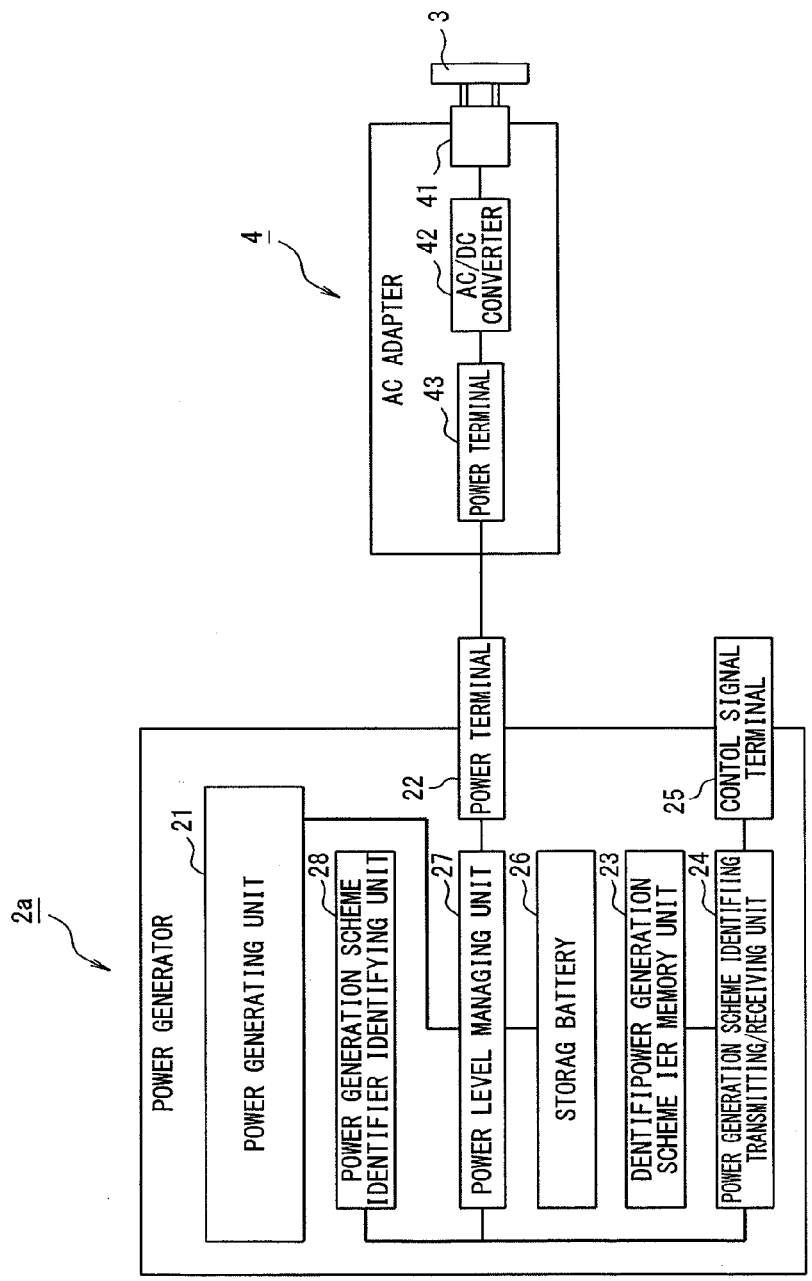
FIG. 8 is a configuration diagram of an AC adapter and a portable device according to the second embodiment of the present invention.

FIG. 8 illustrates an example case in which power is supplied to the power generator 2a with the storage battery 26 through the AC adapter 4, etc., from the commercially available AC power source 3. In the case of the power generator with the storage battery 26, power stored in the storage battery 26 may be power obtained from the power generating unit 21 in the power generator itself and may be power supplied from the AC power source 3 of the commercially available power source. In order to identify the two powers, the power level managing unit 27 in the power generator 2a manages whether the power is supplied from the power generating unit 21 in the power generator 2a, or is supplied from other power generators, such as the commercially available power source and a hand-cranked power generator with a power generation scheme identifier. This power management is performed based on the power generation scheme identifier in the power generator.

(Information Described in Power Generation Scheme Identifier)

FIG. 9 is a diagram illustrating information described in the power generation scheme identifier according to the second embodiment. Identifiers (in FIG. 9, numerals "0" to "3") for determining from which power generation scheme the power stored in the storage battery is obtained, and power levels (in FIG. 9, numeral 700 [mWh], etc.) obtained from respective power generation schemes are described in the power generation scheme identifier.

In this example, an identifier "0" is the commercially available power source, an identifier "1" is solar power generation, an identifier "2" is wind power generation, and an identifier "3" is hand-crank power generation. When power is stored in the storage battery by an external power generator, since the power generation scheme identifier corresponding to that power is stored in the power generator, the power level managing unit 27 can manage respective power levels and the power generation schemes thereof in association with each other.

In the state of FIG. 9, the commercially available power source with the identifier "0" is "200 [mWh]" and solar power generation with the identifier "1" is "700 [mWh]".

A change in the described content in the power generation scheme identifier from the start to end of power supply to the portable device when the power is supplied from the power generator with the storage battery to the portable device will now be explained with reference to FIGS. 10A to 10C. FIGS. 10A to 10C are diagrams illustrating the change in the described content in the power generation scheme identifier when the power is supplied from the power generator to the portable device.

In FIGS. 10A to 10C, it is presumed that power of 200 [mWh] supplied from the commercially available power source and power of 700 [mWh] through solar power generation are stored in the storage battery of the power generator 2a at a time point of starting the power supply. Moreover, it is presumed that power of 100 [mWh] supplied from the commercially available power source is stored in the storage battery of the portable device 1. In this case, as illustrated in FIG. 10A, pieces of information described in the power generation scheme identifier of the power generator 2a are followings:

"identifier "0"|200 [mWh]"; and
"identifier "1"|700 [mWh]",
and pieces of information described in the power generation scheme identifier of the portable device 1 are followings:
"identifier "0"|100 [mWh]"; and
"identifier "1"|0 [mWh]".

After power by 500 [mWh] is supplied from the power generator 2a to the portable device 1 from this time point, pieces of information described in respective power generation scheme identifiers are followings. That is, as illustrated in FIG. 10B, pieces of information described in the power generation scheme identifier of the power generator 2a are:
"identifier "0"|200 [mWh]"; and
"identifier "1"|200 [mWh]",
and pieces of information described in the power generation scheme identifier of the portable device 1 are:
"identifier "0"|100 [mWh]"; and
"identifier "1"|500 [mWh]".

After power by 800 [mWh] is supplied from the time point at which the power supply is started, pieces of information described in respective power generation scheme identifiers are followings. That is, as illustrated in FIG. 10C, pieces of information described in the power generation scheme identifier of the power generator 2a are:
"identifier "0"|100 [mWh]"; and
"identifier "1"|0 [mWh]",
and pieces of information described in the power generation scheme identifier of the portable device 1 are:
"identifier "0"|200 [mWh]"; and
"identifier "1"|700 [mWh]".

At this time, the power generator 2a presents information to the user as if all power of 700 [mWh] obtained through solar power generation with the identifier "1" is supplied to the portable device 1. Hence, after this presentation, information is presented to the user so that power obtained from the commercially available power source with the identifier "0" is to be supplied from the power generator 2a to the portable device 1.

In this case, a presentation is given to the user as if power obtained through solar power generation with the identifier "1" is preferentially supplied to the portable device, but the present invention is not limited to this case. When the power generator 2a has powers corresponding to a plurality of identifiers, a misrecognition may occur in which the portable device 1 determines that it is receiving power supplied from the commercially available power source with the identifier "0" even if the power generator recognizes that the power generator is supplying power derived through solar power generation with the identifier "1". In order to address this disadvantage, the power generator 2a and the portable device 1 can be controlled to exchange the power generation scheme identifiers periodically with each other, compare the power generation scheme identifiers of both power generator 2a and portable device 1, and eliminate a contradiction in the total of power for each identifier. For example, the portable device 1 periodically receives a notification of the identifiers and the power levels corresponding thereto from the power generator 2a, and compares the content of the notification with the content stored in the power generation scheme identifier memory unit 15. This suppresses a misrecognition in both power generator 2a and portable device 1 regarding from which identifier the power is supplied.

(Power Generation Scheme Identifying Method)

In the above-explained power generation scheme identifying systems, the following power generation scheme identifying methods are employed. That is, the power generation scheme identifying method according to the first embodiment includes: a power generating step for generating power to be supplied to an external device; a transmitting step for transmitting, to the external device, a power generation scheme identifier for identifying a power generation scheme of the power generated by the power generating unit; and a presenting step for causing the external device to present the supplied power and the power generation scheme identified by the power generation scheme identifier to a user of the external device. This enables a presentation to the user whether or not power supplied to a portable device is power derived from clean energy.

The power generation scheme identifying method according to the second embodiment further includes: a managing step for managing power stored in a storage battery that stores the power generated by the power generating unit together with other powers in association with a power generation scheme identifier for identifying a power generation scheme of each power, in which in the transmitting step, the power generation scheme identifier managed in the managing step is transmitted to the external device. According to this method, even if the power generator is provided with the storage battery, the power generation scheme of the power stored in the storage battery can be identified, and the identification result can be presented to the user.

(Modifications to the Embodiments)

The configuration was explained above in which the power generator and the portable device respectively include a storage battery, but the storage battery may be detachable. That is, the present system can be realized even if the user purchases a device employing a configuration without a storage battery, purchases the storage battery later, and attaches the storage battery to the device. When the present system employs this configuration, power generation schemes can be identified and managed regardless of the kind of the storage battery.

The configuration of the present system can be realized even if a storage battery is newly purchased, and is attached to a power generator or a portable device in order to replace a weak storage battery.

The explanation was given above of a case in which the portable device is a mobile telephone, but the present invention can be applied to other portable devices, such as a laptop PC (Personal Computer) and a portable music player.

REFERENCE SIGNS LIST

1 Portable device
2, 2a Power generator
3 AC power source
4 AC adapter
11, 22, 43 Power terminal
12, 25 Control signal terminal
13 Power generation scheme identifier receiving unit
14, 28 Power generation scheme identifier identifying unit
15, 23 Power generation scheme identifier memory unit
16, 26 Storage battery
17 Power level managing unit
18 Display unit
21 Power generating unit
24 Power generation scheme identifier transmitting/receiving unit
27 Power level managing unit
31 Cable
32 Connector
41 Power plug
42 AC/DC converter

The invention claimed is:

1. A portable device comprising:
a storage battery configured to store a plurality of types of power comprising a first type of power generated by using a clean energy and supplied from a power generator, and a second type of power generated by using another energy other than the clean energy;
a power generation scheme identifier receiving unit configured to receive, from the power generator, a power generation scheme identifier for identifying a power generation scheme of the first type of power to be supplied; and
a presenting unit configured to present the plurality of types of power and the power generation scheme identified by the power generation scheme identifier received by the power generation scheme identifier receiving unit such that each of the plurality of types of power and the power generation scheme are presented in association with each other,
wherein the portable device is a mobile telephone, and
wherein the presenting unit is configured to present to a user of the mobile telephone, a first ratio of a first amount of the first type of power remaining in the storage battery with respect to a total amount of the storage battery, and a second ratio of a second amount of the second type of power remaining in the storage battery with respect to the total amount of the storage battery.

2. A power generation scheme identifying system comprising:

a power generator comprising:
- a power generating unit configured to generate first type of power to be supplied to an external device, the first type of power being generated by using a clean energy; and
- a power generation scheme identifier transmitting unit configured to transmit, to the external device, a power generation scheme identifier for identifying a power generation scheme of the first type of power generated by the power generating unit; and a portable device comprising:
- a storage battery configured to store a plurality of types of power comprising the first type of power generated by using the clean energy and supplied from the power generator, and a second type of power generated by using another energy other than the clean energy;
- a power generation scheme identifier receiving unit configured to receive, from the power generator, the power generation scheme identifier for identifying the power generation scheme of the first type of power supplied from the power generator; and
- a presenting unit configured to present the plurality of types of power and the power generation scheme identified by the power generation scheme identifier received by the power generation scheme identifier receiving unit such that each of the plurality of types of power and the power generation scheme are presented in association with each other, wherein the portable device is a mobile telephone, and wherein the presenting unit is configured to present to a user of the mobile telephone, a first ratio of a first amount of the first type of power remaining in the storage battery with respect to a total amount of the storage battery, and a second ratio of a second amount of the second type of power remaining in the storage battery with respect to the total amount of the storage battery.

3. A power generation scheme identifying method comprising:
- generating, by a power generator, a first type of power to be supplied to an external device, the first type of power being generated using a clean energy;
- storing a plurality of types of power in a storage battery of the external device, the plurality of types of power comprising the first type of power generated by using the clean energy and supplied from the power generator, and a second type of power generated by using another energy other than the clean energy;
- transmitting, to the external device, a power generation scheme identifier for identifying a power generation scheme of the first type of power;
- receiving, by the external device, the power generation scheme identifier for identifying the power generation scheme of the first type of power; and
- presenting, on the external device, the plurality of types of power and the power generation scheme identified by the power generation scheme identifier, such that each of the plurality of types of power and the power generation scheme are presented in association with each other, wherein the portable device is a mobile telephone, and wherein in the presenting step, a first ratio of a first amount of the first type of power remaining in the storage battery with respect to a total power amount of the storage battery, and a second ratio of a second amount of the second type of power remaining in the storage battery with respect to the total power amount of the storage battery.

* * * * *